(12) United States Patent
Kim (10) Patent No.: US 9,298,690 B2
(45) Date of Patent: Mar. 29, 2016

(54) METHOD FOR ANALYZING EMOTION BASED ON MESSENGER CONVERSATION

(71) Applicant: ScatterLab Inc., Seoul (KR)

(72) Inventor: Jong Youn Kim, Seoul (KR)

(73) Assignee: ScatterLab Inc., Seoul (KR)

( * ) Notice: Subject to any disclaimer, the term of this patent is extended or adjusted under 35 U.S.C. 154(b) by 147 days.

(21) Appl. No.: 14/153,358

(22) Filed: Jan. 13, 2014

(65) Prior Publication Data

US 2015/0186354 A1    Jul. 2, 2015

(30) Foreign Application Priority Data

Dec. 30, 2013    (KR) .................. 10-2013-0167127

(51) Int. Cl.
*G06F 17/27*    (2006.01)
*G06F 7/00*    (2006.01)

(52) U.S. Cl.
CPC .............. *G06F 17/27* (2013.01); *G06F 17/274* (2013.01); *G06F 17/2785* (2013.01)

(58) Field of Classification Search
None
See application file for complete search history.

(56) References Cited

U.S. PATENT DOCUMENTS 6,598,020 B1 *   7/2003   Kleindienst ............ G10L 13/08
                                                          704/270
2014/0220526 A1 *   8/2014   Sylves ............... G06Q 30/0201
                                                          434/238

FOREIGN PATENT DOCUMENTS

JP    2007-272374    10/2007
KR    10-2012-0096187    8/2012

* cited by examiner

*Primary Examiner* — Marcus T Riley
(74) *Attorney, Agent, or Firm* — Fenwick & West LLP (57) ABSTRACT

A method for analyzing emotion based upon a messenger conversation is disclosed herein. The method may include the steps of storing survey information of a user respective to a specific counterpart with whom the user wishes to analyze emotion, opening a conversation history between the user and the specific counterpart, analyzing the survey information and the conversation history, thereby analyzing the emotion between the user and the specific counterpart, and showing the emotion analysis to the user.

5 Claims, 8 Drawing Sheets

| Current method | Grouping | |
|---|---|---|
| <SI=EPH> | <HIGH=EPH> | ⎫ 510 |
| <EUSI=EPH> | <HIGH=EPH> | ⎭ |
| <RO=JKM> | <TOWARD=JKM> | ⎫ 520 |
| <EURO=JKM> | <TOWARD=JKM> | ⎭ |
| <GWA=JC> | <WITH=JC> | ⎫ 530 |
| <WA=JC> | <WITH=JC> | ⎭ |
| <NA=JC> | <OR=JC> | ⎫ 540 |
| <EENA=JC> | <OR=JC> | ⎭ |
| <RANG=JC> | <WITHWHOM=JC> | ⎫ 550 |
| <EERANG=JC> | <WITHWHOM=JC> | ⎭ |
| <LGGA=EFN> | <FUTUREGGA=EFN> | ⎫ 560 |
| <EULGGA=EFN> | <FUTUREGGA=EFN> | ⎭ |
| <SCREAM1=IC> | <SPC04=MUN> | ⎫ |
| <SCREAM2=UN> | <SPC04=MUN> | |
| <SCREAM3=UN> | <SPC04=MUN> | |
| <SCREAM4=UN> | <SPC04=MUN> | 570 |
| <YIPPEE=UN> | <SPC04=MUN> | |
| <HURRAY=UN> | <SPC04=MUN> | |
| <YEA=IC> | <SPC04=MUN> | ⎭ |
| <(^.*)=SW> | <SML02=EMO> | ⎫ |
| <(^0^)=EMO> | <SML02=EMO> | |
| <(^_^)=EMO> | <SML02=EMO> | 580 |
| <(^▽^)=EMO> | <SML02=EMO> | |
| <*^^*=EMO> | <SML02=EMO> | ⎭ |

FIG. 6

| Original Term | Abstraction | |
|---|---|---|
| <Cold=NNG> | <DISEASE=NNG> | |
| <Rheumatism=NNG> | <DISEASE=NNG> | |
| <Headache=NNG> | <DISEASE=NNG> | 610 |
| <Flu=NNG> | <DISEASE=NNG> | |
| <Stomachache=NNG> | <DISEASE=NNG> | |
| <Strawberry=NNG> | <FRUIT=NNG> | |
| <Banana=NNG> | <FRUIT=NNG> | |
| <Grape=NNG> | <FRUIT=NNG> | |
| <Green Grape=NNG> | <FRUIT=NNG> | |
| <Raspberry=NNG> | <FRUIT=NNG> | |
| <Watermelon=NNG> | <FRUIT=NNG> | 620 |
| <Berry=NNP> | <FRUIT=NNG> | |
| <Tomato=NNG> | <FRUIT=NNG> | |
| <Grapefruit=XR> | <FRUIT=NNG> | |
| <Melon=NNG> | <FRUIT=NNG> | |
| <Fruit=NNG> | <FRUIT=NNG> | |
| <Citron=NNG> | <FRUIT=NNG> | |
| <Friday=NNG> | <YOIL=NNG> | |
| <Thursday=NNG> | <YOIL=NNG> | |
| <Wednesday=NNG> | <YOIL=NNG> | |
| <Monday=NNG> | <YOIL=NNG> | 630 |
| <Sunday=NNG> | <YOIL=NNG> | |
| <Saturday=NNG> | <YOIL=NNG> | |
| <Tuesday=NNG> | <YOIL=NNG> | |

FIG.7

| Context | Pattern |
|---|---|
| schedule | <Busy=VA> |
| schedule | <Hectic=VA> |
| schedule | <Relaxed=VA> |
| schedule | <Meaningful=VA> |
| schedule | <Free=VA> |
| schedule | <Very free=VA> |
| schedule | <Heavy=VA> |
| schedule | <Very heavy=VA> |
| schedule | <Busy=VA> |
| Weather | <Cold=VA> |
| Weather | <Warm=VA> |
| Weather | <Chilly=VA> |
| Weather | <Sunny=VA> |
| Weather | <Cloudy=VA> |
| Weather | <SEASON=NNG> |
| Weather | <Soaking=MAG> |
| Weather | <Sunshine=MAG> |
| Appearance | <Handsome=VA> |
| Appearance | <Ugly=VA> |
| Appearance | <Pretty=VA> |
| Appearance | <Cute=VA> |
| Appearance | <Handsome=VA> |
| Appearance | <Beautiful=VA> |
| Appearance | <Pretty=VA> |

710 = schedule rows
720 = Weather rows
730 = Appearance rows

METHOD FOR ANALYZING EMOTION BASED ON MESSENGER CONVERSATION

CROSS-REFERENCE TO RELATED APPLICATIONS

This application claims the benefit of the Korean Patent Application No. 10-2013-0167127, filed on Dec. 30, 2013, which is hereby incorporated by reference as if fully set forth herein.

BACKGROUND OF THE INVENTION

1. Field of the Invention

The present invention relates to a method for analyzing thoughts or opinions regarding a person or object based upon a text.

2. Discussion of the Related Art

Generally, a written text corresponds to a collection of words forming a sentence and a collection of sentences forming a completed block of written text. Herein, a word corresponds to a basic unit of a sentence configuring the written text, and the act of composing a written text includes a problem of determining a relationship between one word and another word and a problem of selecting an appropriate word best-fitting a context of the written text, when composing the written text. A process of resolving the two problems may generally occur during the process of writing a text, and, among the two problems, when concentrating on the analysis of the second problem, i.e., the problem of selecting an appropriate word, one may be capable of deducing the writers emotions based upon such analysis. Each of the words may be variably used within a sentence, and, in some cases, the same word may contain different meanings. However, it is apparent that a particular word contains a specific tendency. Accordingly, the writer may consistently focus on the usage of a word including a specific tendency, and, when performing a literary, cognitive literary, and psycho-analytic approach of the written text, a standard for categorizing words through an analysis of words based upon general human tendencies may be determined. Thereafter, by categorizing words based upon such categorization standard, the emotions of the writer may be analyzed and categorized.

The related art technologies for analyzing emotions based upon a text are mostly focused on analyzing thoughts or opinions on a particular person or object over social network services (SNS) (e.g., Twitter, Facebook, and so on). However, such methods are limited in that the emotion analysis can be carried out only when a direct opinion has been conveyed with respect to the corresponding person or object. For example, it may be deduced from the sentence 'I like you' that the writer has positive feelings towards his (or her) counterpart. However, positive emotions (or feelings) towards the writer's counterpart cannot be deduced from the sentence 'I am hungry'. When two individuals are carrying out a messenger conversation (or dialogue), unless the two individuals are in an intimate relationship, it is very unlikely for one person to directly convey affectionate expressions to his (or her) counterpart. Even if two individuals are in an intimate relationship, the two individuals may not express their affection to one another on a daily basis. In this case, it may be difficult for determining the feelings between one another by using the related art method.

SUMMARY OF THE INVENTION

Accordingly, the present invention is directed to a method for analyzing emotion based on a messenger conversation that substantially obviates one or more problems due to limitations and disadvantages of the related art.

An object of the present invention is to provide a method for analyzing emotion based on a messenger conversation that can analyze the emotions of a user toward a specific counterpart from a casual messenger conversation (or dialogue), which does not directly show the feelings (or emotions) of the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an aspect of the present invention, a method for analyzing emotion based on a messenger conversation may include the steps of storing survey information of a user respective to a specific counterpart with whom the user wishes to analyze emotion, opening a conversation history between the user and the specific counterpart, analyzing the survey information and the conversation history, thereby analyzing the emotion between the user and the specific counterpart, and showing the emotion analysis to the user.

The step of storing survey information of a user may use the survey information, so as to decide a type of conversation history between the specific counterpart and the user.

The step of showing the emotion analysis to the user may show values respective to multiple emotion procedures and requests virtual coins for a particular emotion parameter.

In another aspect of the present invention, a method for analyzing emotion based on a messenger conversation may include the steps of reducing pattern types in a conversation history between a specific counterpart and a user, determining context of the conversation history, thereby reducing context types, and recognizing a pattern in the conversation history, wherein the pattern types are reduced, and wherein the context types are reduced.

The step of reducing pattern types in a conversation history between a specific counterpart and a user may include the steps of grouping the conversation history by grammar-based functions and significance-based functions, and converting elements within the conversation history to abstract words, wherein the elements are decided in accordance with characteristics and situations regardless of emotion.

The step of reducing pattern types may lose pattern information non-related to emotion and may reduce pattern types related to emotion.

A time point up to which a pattern corresponding to a specific context type does not continuously occur in the conversation history for a predetermined number of times may be identified as one context type.

The step of recognizing a pattern in the conversation history, wherein the pattern types are reduced, and wherein the context types are reduced, may reduce the pattern types and may extract a pattern from the conversation history having the context type reduced.

Mechanical learning may be performed on an emotion of the user toward the specific counterpart by using the extracted pattern.

A model may be generated for each context types, and a pattern corresponding to a format of the conversation history may be differentiated from a pattern corresponding to the conversation history.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
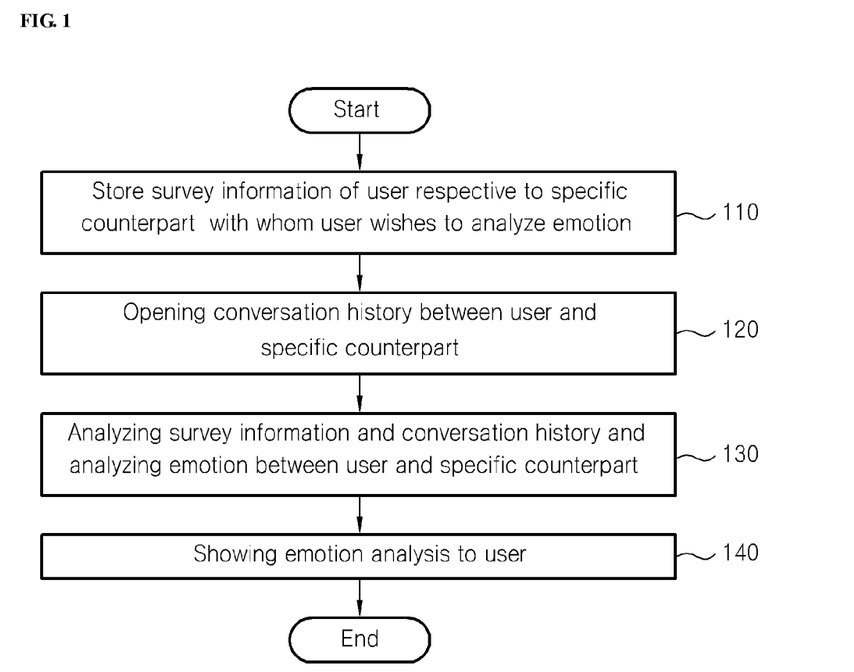
FIG. 1 illustrates a flow chart for describing a process of executing an application according to an exemplary embodiment of the present invention.

FIG. 1 illustrates a flow chart for describing a process of executing an application according to an exemplary embodiment of the present invention.

The process of executing the application according to the exemplary embodiment of the present invention may include a step of storing survey information of a user respective to a specific counterpart with whom the user wishes to analyze emotion (110), a step of opening a conversation history between the user and the specific counterpart (120), a step of analyzing the survey information and the conversation history, thereby analyzing the emotion between the user and the specific counterpart (130), and a step of showing the emotion analysis to the user (140).

In step (110), the survey information of the user respective to the specific counterpart (or friend) with whom the user wishes to perform emotion analysis. For example, in order to add the specific counterpart as an emotion analysis subject, survey information, such as how well the user knows the specific counterpart, how much the user and the counterpart have in common, and so on, may be received from the user and may then be stored. When adding a specific counterpart with whom the user wishes to analyze emotion, by performing a survey, among diverse analysis models, one specific model with which the analysis is to be carried out may be selected. For example, even if the content of a conversation is the same, the emotional correlation may differ completely depending upon the level of intimacy (or friendship). Therefore, a relationship level may first be determined by performing a survey, and, then, the analysis may be carried out by using a pattern best-fitting the determined relationship level. At this point, the survey information may be inputted in the form of values respective to the relationship level. By using such survey information, a conversation history type between the user and the specific counterpart may be decided. Multiple pre-decided types of the conversation history type may be stored in the application.

In step (120), a conversation history between the user and the specific counterpart may be opened. In other words, a conversation carried out between the user and the specific counterpart over a messenger or SNS may be opened. For example, the conversation carried out over the messenger or SNS may be stored in an SD card. Accordingly, when the corresponding application is executed, the conversation history stored in the SD card may be used to perform emotion analysis. In addition to storing the conversation history in an SD card, a method for transmitting the conversation history via e-mail, and other similar methods may be used as a method for opening the conversation history between the specific counterpart and the user.

In step (130), by analyzing the conversation history between the user and the specific counterpart, the emotion (or feelings) between the user and the specific counterpart may be analyzed. By focusing on analyzing the issue of which word is being selected from the conversation history, the emotion of the writer of the text may be deduced from the selected word. At this point, two different messages having the same meaning may each be expressed by using different words. For example, when transmitting a message indicating the user has had his (or her) meal, depending upon the level of intimacy with the specific counterpart, the user may send a message saying "Yup! I had my lunch (or dinner)", or the user may send a message saying "OC (i.e., abbreviation for 'Of course') had lunch (or dinner)". The step of carrying out emotion analysis may be realized in an order of reducing pattern types in the conversation history between the user and the specific counterpart, reducing context types, and recognizing the patterns. For example, by grouping the conversation history in accordance with grammar-based functions and significance-based functions, and by converting elements, which are decided in accordance with characteristics and situations regardless of emotions (or feelings) within the conversation history, to abstract words, the pattern types may be reduced. Thereafter, by determining the context of the conversation history, the context type may also be reduced. Herein, one context type may be defined as a time point up to which a pattern corresponding to a specific context type does not continuously occur in the conversation for a predetermined number of times. Then, the pattern type is reduced, and a pattern of the conversation history having the context type reduced may be recognized. At this point, a pattern is extracted, and mechanical learning may be performed on emotions of the counterpart toward the user by using the extracted pattern. Accordingly, a model for each context type may be generated, and a pattern corresponding to the conversation history type may be differentiated from a pattern corresponding to the conversation history.

In step (140), the emotion analysis may be shown to the user. At this point, values respective to multiple emotion parameters may be shown, and a virtual coin may be requested for a particular emotion parameter. For example, the particular emotion parameter may include Affection Level, Friendship Level, Intimacy Level, and so on. Such particular emotion parameter may be indicated in the form of percentage, graph, and so on.

Figure 2:
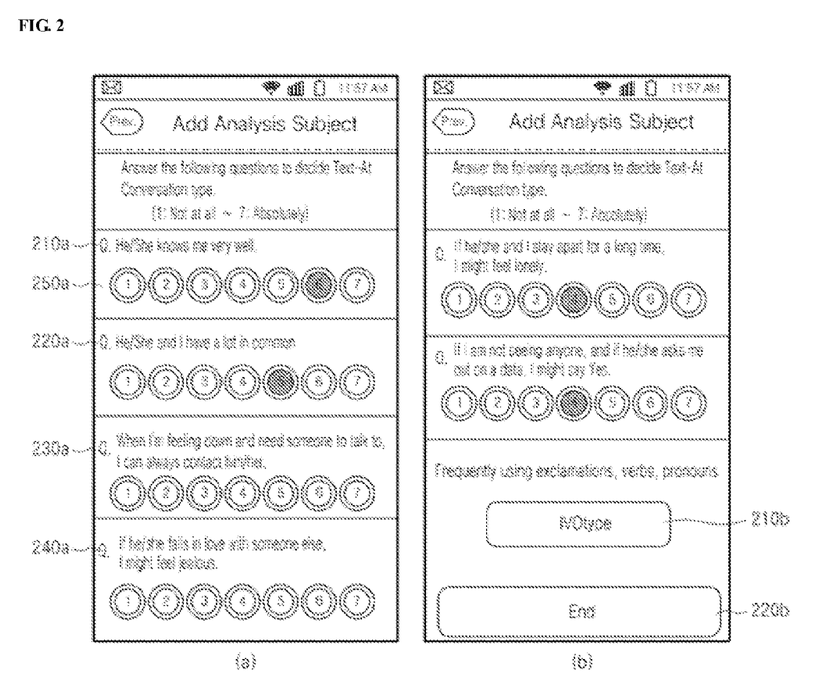
FIG. 2 illustrates a method for storing survey information of a user according to the exemplary embodiment of the present invention.

FIG. 2 illustrates a method for storing survey information of a user according to the exemplary embodiment of the present invention.

Referring to FIG. 2(a), when executing an application, a process of inputting survey information of the user with respect to a specific counterpart with whom the user wishes to perform emotion analysis is shown. For example, multiple survey information questions 210a, 220a, 230a, 240a, . . . may be indicated. By receiving answers (or response) to such survey information from the user, a type of conversation history for performing the emotion analysis may be decided. At this point, the survey information may be inputted in a form of respective level values 250a. For example, with respect to a question, such as 'How much do you and your counterpart have in common?', depending upon the level of the answer, a value within a scale ranging from 1 to 7 may be inputted, wherein 1 indicates 'Not at all', and wherein 7 indicates 'Absolutely'.

Referring to FIG. 2(b), a conversation type respective to the answer to the survey information is shown. A plurality of pre-decided conversation history types may be stored in the application. By using the survey information, which is received from the user, a type of the conversation history between the specific counterpart and the user may be decided. In other words, in the process inputting the survey information, when a specific counterpart with whom the user wishes to perform emotion analysis is added, a specific model may be selected from diverse analysis models through a survey, so that the selected model can be used for the analysis. For example, a conversation having the same content, the correlation of emotions may differ completely depending upon the intimacy level. Therefore, by determining relationships through the survey, a pattern best-fitting the determined relationship may be used to perform analysis. For example, an IVO type 210b is shown in FIG. 2(b). The IVO type 210b may correspond to a type frequently using exclamations, verbs, and pronouns. When the step of inputting survey information is completed, an End button 220b is clicked, so as to move on to the next steps or to perform emotion analysis based upon the IVO type 210b.

Thereafter, a conversation history between the user and the specific user with whom the user wishes to perform emotion analysis may be opened. For example, the conversation history between the specific counterpart and the user may be stored in an SD card in a messenger, from which the conversation history is to be opened. Accordingly, the emotion analysis may be performed by using the conversation history, which is stored in the SD card. In addition to storing the conversation history in an SD card, a method for transmitting the conversation history via e-mail, and other similar methods may be used as a method for opening the conversation history between the specific counterpart and the user.

Figure 3A:
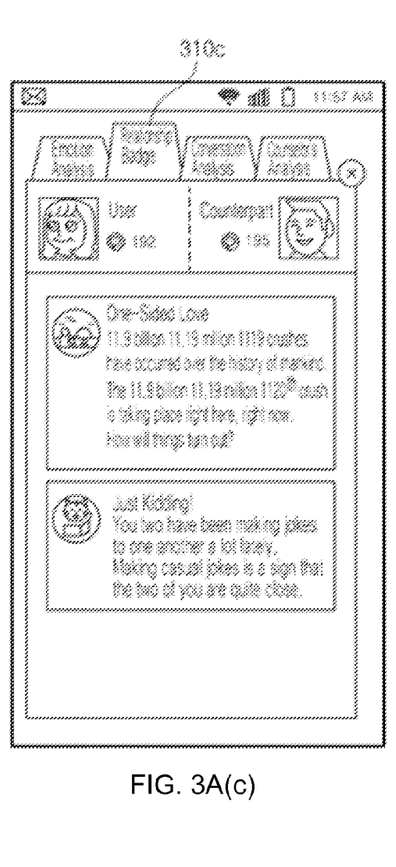
FIG. 3A and FIG. 3B illustrate a method for showing values respective to multiple emotion parameters according to the exemplary embodiment of the present invention.
Figure 3B:
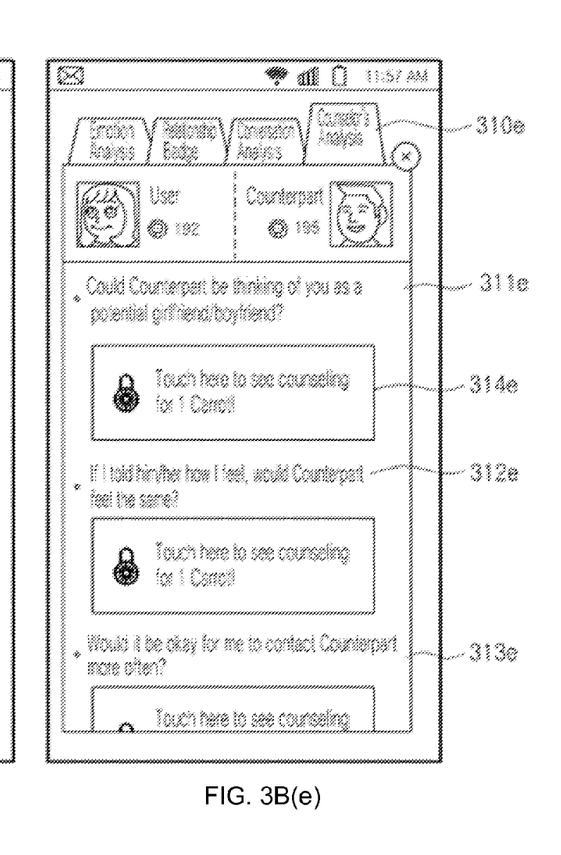

FIG. 3 illustrates a method for showing values respective to multiple emotion parameters according to the exemplary embodiment of the present invention. Emotion analysis may be performed by using the conversation history between the specific counterpart and the user. The step of carrying out emotion analysis may be realized in an order of reducing pattern types in the conversation history between the user and the specific counterpart, reducing context types, and recognizing the patterns. For example, by grouping the conversation history in accordance with grammar-based functions and significance-based functions, and by converting elements, which are decided in accordance with characteristics and situations regardless of emotions (or feelings) within the conversation history, to abstract words, the pattern types may be reduced. Thereafter, by determining the context of the conversation history, the context type may also be reduced. Herein, one context type may be defined as a time point up to which a pattern corresponding to a specific context type does not continuously occur in the conversation for a predetermined number of times. Then, the pattern type is reduced, and a pattern of the conversation history having its context types reduced may be recognized. At this point, a pattern is extracted, and mechanical learning may be performed on emotions of the counterpart toward the user by using the extracted pattern. Accordingly, a model for each context type may be generated, and a pattern corresponding to the conversation history type may be differentiated from a pattern corresponding to the conversation history. After performing emotion analysis through the above-described process, values of the multiple emotion parameters may be shown to the user.

Referring to FIG. 3A(a), the multiple parameters respective to the emotion analysis 310a may be shown in the form of percentage and graph. The parameter of the emotion analysis 310a may include an Affection Level 311a, a Friendship Level 312a, an Intimacy Level 313a, and so on. The value of such parameters may be shown in the form of percentage 314a. Additionally, an emotional development may be shown in the form of a graph 310b on a daily basis, a weekly basis, and a monthly basis, as shown in FIG. 3A(b).

Referring to FIG. 3A(c), after performing emotion analysis, a Relationship Badge 310c may be shown. Based upon the conversation history between the specific counterpart and the user, the relationship badge may be displayed after determining the relationship between the user and the specific counterpart, or after analyzing the feelings the user and the specific counterpart have toward one another.

Referring to FIG. 3B(d), after performing emotion analysis, a result of a Conversation Analysis 310d between the specific counterpart and the user may be displayed. For example, as shown in FIG. 3B(d), a percentage may be shown for each subject 311d of the conversation. The subject of the conversation may include Jokes, Contacts/Relationships, Daily schedule, Relocation/Position, Feelings, Condition, Work/Job, Miscellaneous, and so on. By analyzing the percentage for each subject of the conversation, the analyzed percentage may then be displayed in the form of a graph 312d.

Referring to FIG. 3B(e), after performing emotion analysis, a Counselor's Analysis 310e may be displayed. Multiple counselor's analyses 311e, 312e, 313e, . . . are displayed, and a virtual coin may be requested 314e in order to see the corresponding result. For example, a counselor's analysis on "Could Counterpart be thinking of you as a potential girlfriend/boyfriend?" 311e may be displayed. And, a guidance phrase indicating 'Touch here to see counseling for 1 Carrot!' 314e may be displayed under the analysis result slot, and, herein, a Carrot may correspond to a virtual coin. When payment of such virtual coin is made, the result of the counselor's analysis may be verified.

Figure 4:
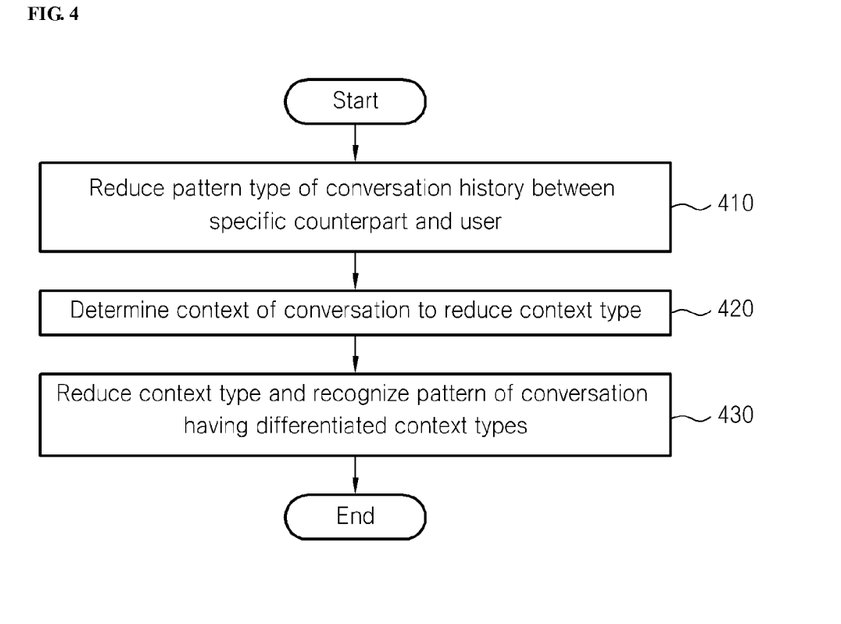
FIG. 4 illustrates a method for analyzing emotion based on a messenger conversation according to the exemplary embodiment of the present invention.

FIG. 4 illustrates a method for analyzing emotion based on a messenger conversation according to the exemplary embodiment of the present invention.

A method for analyzing emotion based on a messenger conversation may include the steps of reducing pattern types in a conversation history between a specific counterpart and a user (410), determining context of the conversation history, thereby reducing context types (420), and recognizing a pattern in the conversation history, wherein the pattern types are reduced, and wherein the context types are reduced (430).

In step (410), pattern types in a conversation history between the specific counterpart and the user may be reduced. The reduction of the pattern types corresponds to a process of reducing the pattern types that may occur during a messenger conversation. The types of messages that can be made of a combination of multiple words are uncountable. If the combination of words is unlimited, the number of patterns and habits that can be detected within such combination of words may also be unlimited. Accordingly, within such unlimited and segmented patterns, it will be very difficult to find a variable that can be generally applied to conversations carried out by people in general. And, even if such variable is found, a problem of overfitting may occur. Therefore, it is imperative to reduce the number of possible pattern combinations, in order to effectively find a pattern and to enhance the performance of an analysis model. By reducing the pattern types, pattern information non-related to emotion may be lost, thereby reducing the number of available patterns. By performing the above-described process, characteristics and patterns of a conversation shared between individuals having strong emotions for one another may be effectively found.

The above-described step of reducing pattern types in a conversation history between a specific counterpart and a user may include the steps of grouping the conversation history by grammar-based functions and significance-based functions, and converting elements within the conversation history to abstract words, wherein the elements are decided in accordance with characteristics and situations regardless of emotion.

In the step of grouping conversation history, the conversation history may be grouped by grammar-based functions and significance-based functions. The grouping process corresponds to a process of grouping different morphemes to one group, wherein the morphemes have completely identical or similar grammar-based functions and significance-based functions yet different formats. By performing this process, segmentation of morphemes that are frequently used may be remarkably reduced. For example, in Korean, expressions of seniority (or highness) '-si-' and '-eusi-', which are respectively included in "Ga-si-get-ssuh-yo? (meaning 'Would you like to go?' in Korean)" and "Jup-eusi-get-ssuh-yo? (meaning 'Would you like to fold?' in Korean)", have the same grammatical function, yet its format may be changed in accordance with the verb. And, when grouping the words to a single group indicating the expression of highness (or seniority), segmentation may be reduced.

Figure 5:
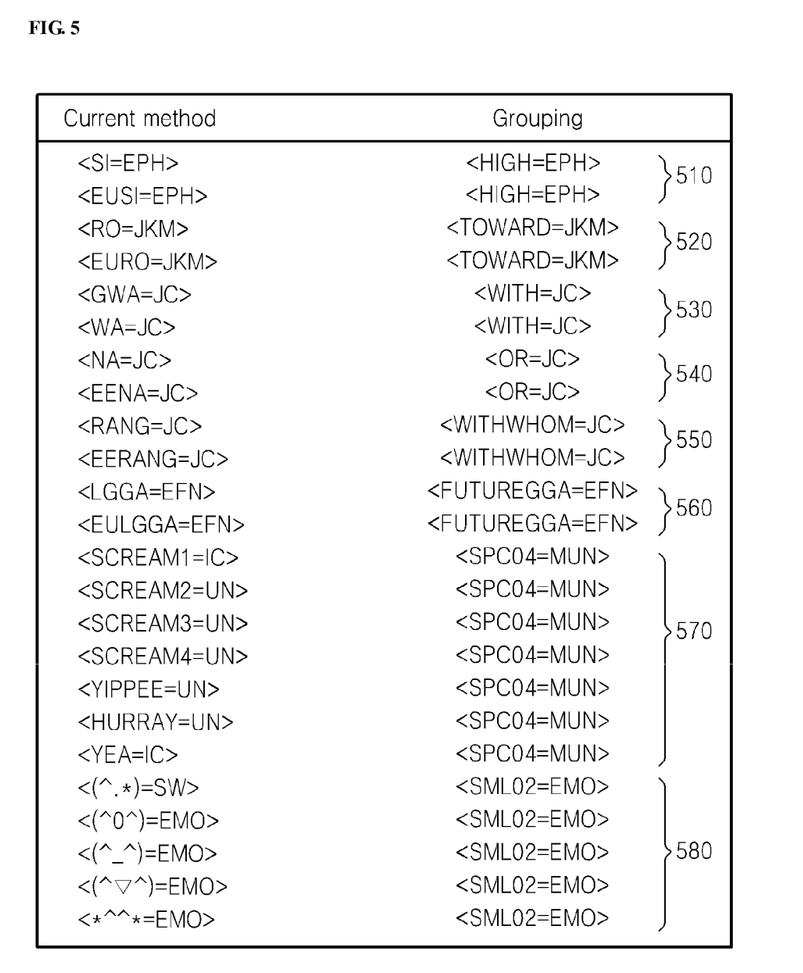
FIG. 5 illustrates a step of grouping conversation history according to the exemplary embodiment of the present invention.

FIG. 5 illustrates a step of grouping conversation history according to the exemplary embodiment of the present invention. Referring to FIG. 5, a list of original terms and grouped terms are shown. Grouping list may include <HIGH=EPH> 510, <TOWARD=JKM> 520, <WITH=JC> 530, <OR=JC> 540, <WITHWHOM=JC> 550, <FUTUREGGA=EFN> 560, <SPC04=MUN> 570, <SML02=EMO> 580, and so on. For example, when expressions of highness (or expression of seniority), such as '-si- (in Korean)' and '-eusi- (in Korean)', are included in the conversation, the corresponding expression may be grouped to a <HIGH=EPH> 510 group.

The process of converting elements within the conversation history to abstract words corresponds to a process of reducing pattern types by converting elements, which are decided by characteristics and situations regardless of emotion within the conversation. For example, words, such as 'Cold', 'Rheumatism', 'Headache', 'Flu', and 'Stomachache', correspond to words that are selected in accordance with personal situations of a user and that are used in the conversation. Among such words, the name of a disease or sickness of the user is not important in carrying out the emotion analysis. Nevertheless, the fact that a pattern related to a disease or sickness has occurred in the conversation may be more important. Accordingly, by performing abstraction of such words to 'Disease', the overall pattern type may be reduced.

Figure 6:
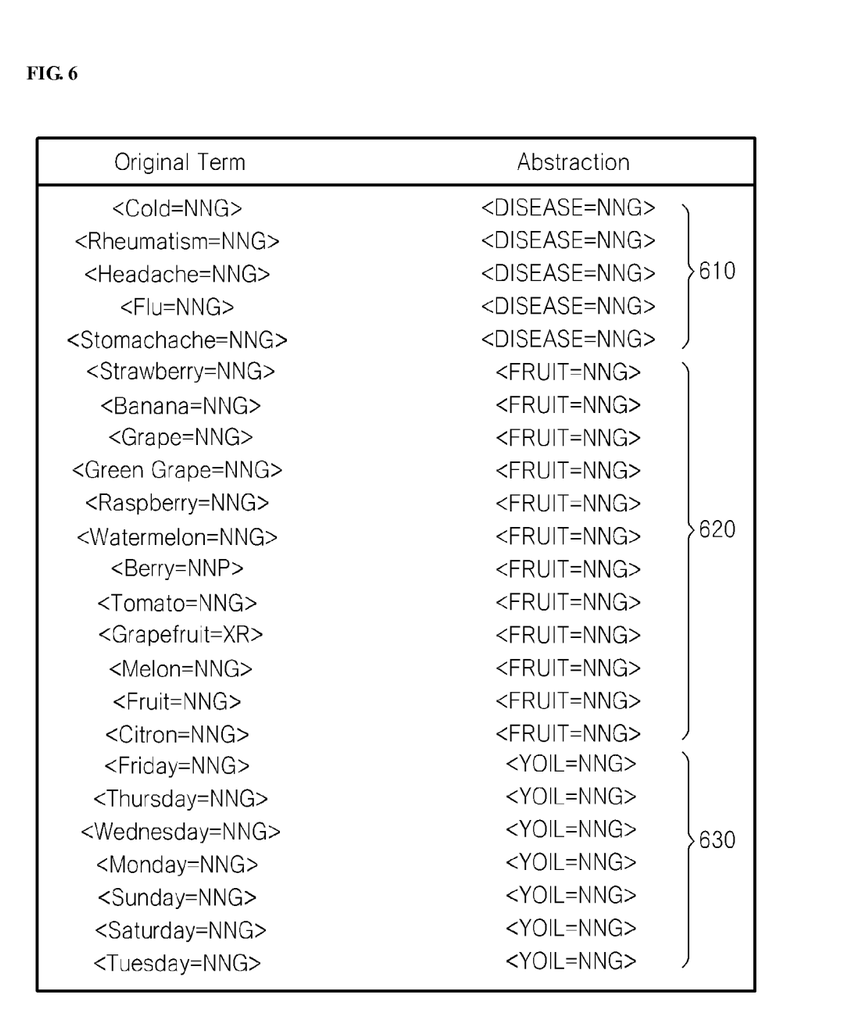
FIG. 6 illustrates a step of performing abstraction on the conversation history according to the exemplary embodiment of the present invention.

FIG. 6 illustrates a step of performing abstraction on the conversation history according to the exemplary embodiment of the present invention. Referring to FIG. 6, a list of original terms and abstracted terms are shown. Herein, abstraction may include <DISEASE=NNG> 610, <FRUIT=NNG> 620, <YOIL=NNG> 630, and so on. For example, when the word 'Strawberry' or 'Banana' is included in the conversation, abstraction may be performed to <FRUIT=NNG> 620. By performing such grouping and abstraction processes, the pattern types may be reduced.

Subsequently, in step (420), the context of the conversation history may be determined, so as to reduce the context types. This corresponds to a process of determining a context of a series of conversation between two individuals, thereby differentiating the conversation by context. Diverse context and subjects may exist in one conversation history. For example, the conversation may first start by talking about the weather, then the conversation may be carried on by talking about baseball, and then, the conversation may be continued by talking about exams. Herein, areas of the patterns that may occur within the context of each conversation may be different from one another. Patterns that may occur in a specific context are limited, and other patterns cannot occur within the context. For example, in a context of asking about the weather, such as 'What's the weather like today?', 'It doesn't seem too cold' may correspond to an appropriate response, whereas 'I am studying for my exams' cannot be used as the response. Within the context of the weather, the person replying may select a word from a selection of words. However, words that are outside of the context of the weather cannot be selected at all. As described above, even if a pattern does not occur in the conversation, since the patterns are required to be differentiated as 'pattern available for selection yet non-selected' (e.g., 'It's cold', 'It's hot', 'It's warm', and so on), and a 'pattern that cannot be selected at all within the context' (e.g., 'I'm studying for my exams', 'I'm tired', and so on), the conversation history may be differentiated by context by reducing the context types. At this point, patterns corresponding to each context may be stored in advance in a dictionary. And, one context type may be defined as a time point up to which a pattern corresponding to a specific context type does not continuously occur in the conversation for a predetermined number of times.

Figure 7:
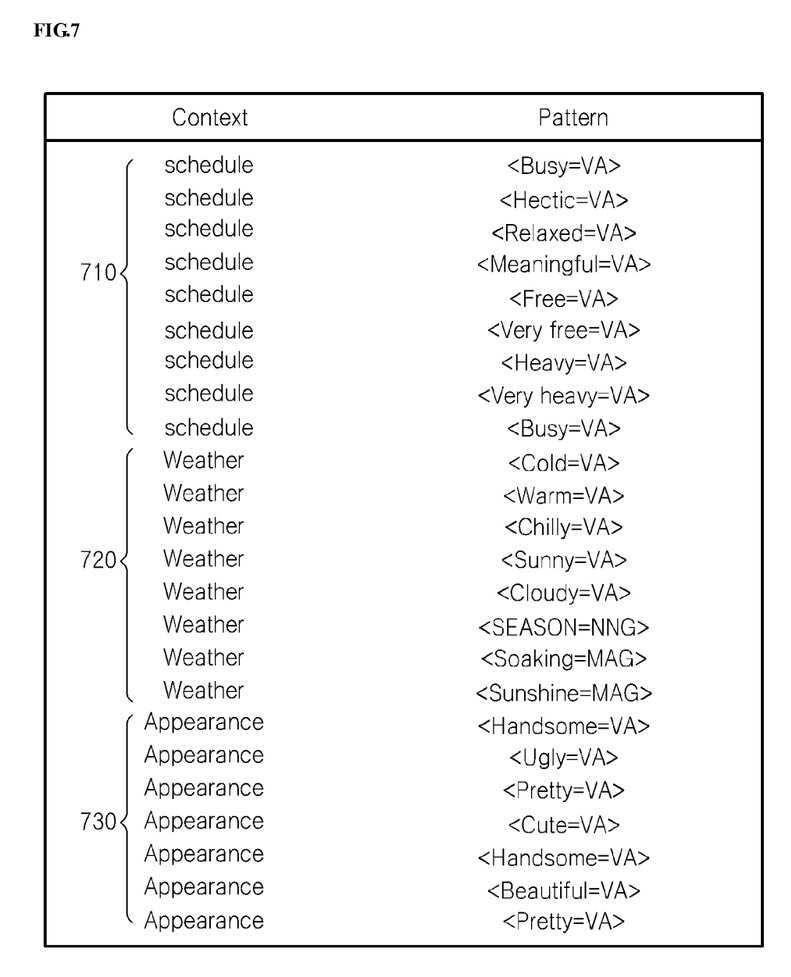
FIG. 7 illustrates a step of reducing context types according to the exemplary embodiment of the present invention.

FIG. 7 illustrates a step of reducing context types according to the exemplary embodiment of the present invention. Referring to FIG. 7, a context and pattern list is shown. The context may include 'Schedule (710)', 'Weather (720)', and 'Appearance (730)'. For example, in case a pattern of <Busy=VA> or <Relaxed=VA> is included in the conversation history, this may be categorized (or differentiated) as the context of 'Schedule (710)'.

In step (430), a pattern of a conversation history having the pattern type reduced and having the context type reduced may be recognized. And, a pattern may be extracted from a conversation history having a reduced context type having a reduced pattern type. Thereafter, based upon the extracted pattern and the survey information, mechanical learning may be performed on the emotions respective to the specific counterpart of the user. Accordingly, a model respective to each context type may be generated, and a pattern corresponding to a conversation history format and a pattern corresponding to the conversation history may be differentiated from one another.

For example, the process of extracting different types of format patterns may be performed as described below.

1) Proper spacing, punctuation, and grammatical marks ratio: determines a ratio of how accurately spacing, punctuation, and grammatical marks are performed in the conversation history.

2) Nonstandard language type pattern

Typographical errors: a pattern occurring due to mistyping the keyboard (e.g., I wll, Are you leavimg?).

Intentional nonstandard language: nonstandard language deliberately used for particular effects or connotation (e.g., Feeling betto?, See you tomaw).

Other nonstandard language: nonstandard language used due to an incorrect knowledge of standard language (e.g., I wont.)

3) Response (or Reply) time: an average time length (in minutes) taken for responding (or replying) to a question type message.

4) Fast response (or reply) ratio: determines a percentage (%) of a fast reply (within 3 minutes) ratio from the total number of replies.

5) Initiating message and closing message ratio: determines a ratio of messages initiating a conversation and messages closing the conversation being transmitted.

6) Conversation duration: duration between the beginning of a conversation and the ending of the conversation.

7) Average conversation length

8) Short message/long sentence message ratio

9) Morpheme ratio: percentage (%) of each morpheme type occupying (or occurring in) a message Additionally, the process of extracting pattern types in a conversation history may first recognize patterns, which have the longest length based upon patterns occurring more than a level (i.e., 100 times) that is available for generalization within the database for each context. This is because patterns having longer lengths are more likely to have limited usage with respect to a specific emotion and situation.

By using the above-described method for analyzing emotion based upon a messenger conversation, connotations and emotions that are not obviously and significantly conveyed may be analyzed from a text. Additionally, in addition to determining emotions, this method may also be used for predicting elements that are not directly disclosed in the text.

As described above, the method for analyzing emotion based upon a messenger conversation has the following advantages. Unlike in the related art method, according to the exemplary embodiments of the present invention, instead of direct emotional expressions, emotions (or feelings) between two or more individuals may be analyzed from a casual messenger conversation. The feelings (or emotions) between a user and the user's counterpart may be analyzed from a casual messenger conversation, without having to refer to any direct opinion on a corresponding object or person.

The above-described device according to the exemplary embodiment of the present invention may be realized in the form of a hardware component, a software component, and/or a combination of a hardware component and a software component. For example, the device and corresponding components according to the above-described exemplary embodiments of the present invention may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present invention, the present invention may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present invention may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present invention, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

It will be apparent to those skilled in the art that various modifications and variations can be made in the present invention without departing from the spirit or scope of the inventions. For example, the above-described techniques may be executed in an order different from that described in the description of the present invention, and/or the components of the above-described system, structure, equipment (or device), circuit, and so on, may be combined in a format different that of the above-described method according to the present invention, and an adequate result may be achieved even if the above-described components of the present invention are replaced by any other component or its equivalent.

Thus, it is intended that the present invention covers other realizations and other embodiments of this invention provided they come within the scope of the appended claims and their equivalents.

What is claimed is:

1. A computer-implemented method of a computer system for analyzing emotion based on a messenger conversation, the computer system executing steps comprising:
    storing survey information of a user respective to a specific counterpart with whom the user wishes to analyze emotion;
    opening a conversation history in a form of text between the user and the specific counterpart;
    reducing, by the computer system, pattern types in the conversation history in the form of text between the specific counterpart and the user;
    determining context of the conversation history in the form of text thereby reducing context types;
    recognizing a pattern in the conversation history in the form of text, wherein the pattern types are reduced, and wherein the context types are reduced, and
    determining, by the computer system, the emotions of the counterpart towards the user based on the pattern;
    wherein the step of reducing the pattern types in the conversation history between the specific counterpart and the user comprises:
        grouping, by the computer system, the conversation history by grammar-based functions and significance-based functions; and
        converting, by the computer system, elements within the conversation history to abstract words, wherein the elements are decided in accordance with characteristics and situations regardless of emotion,
    wherein the step of reducing pattern types removes pattern information non-related to emotion and reduces pattern types related to emotion.

2. The method of claim 1, wherein the step of determining context of the conversation history, thereby reducing context types, identifies a time point up to which a pattern corresponding to a specific context type does not continuously occur in the conversation history for a predetermined number of times as one context type.

3. The method of claim 1, wherein the step of recognizing a pattern in the conversation history, wherein the pattern types are reduced, and wherein the context types are reduced, reduces the pattern types and extracts a pattern from the conversation history having the context type reduced.

4. The method of claim 3, wherein mechanical learning is performed on an emotion of the user toward the specific counterpart by using the extracted pattern.

5. The method of claim 4, wherein a model is generated for each context types, and wherein a pattern corresponding to a format of the conversation history is differentiated from a pattern corresponding to the conversation history.

* * * * *